United States Patent
Schmid et al.

(10) Patent No.: US 8,490,983 B2
(45) Date of Patent: Jul. 23, 2013

(54) WHEEL SUSPENSION FOR A MOTOR VEHICLE

(75) Inventors: Wolfgang Schmid, Freising (DE); Heinrich Beringer, Denkendorf (DE); Hugo Müller, Rohrenfels-Ballersdorf (DE); Karl-Heinz Meitinger, München (DE); Wilfried Michel, Riedenburg (DE); Christoph Kossira, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/578,780

(22) PCT Filed: Jan. 21, 2011

(86) PCT No.: PCT/EP2011/000237
§ 371 (c)(1),
(2), (4) Date: Aug. 13, 2012

(87) PCT Pub. No.: WO2011/098207
PCT Pub. Date: Aug. 18, 2011

(65) Prior Publication Data
US 2012/0306174 A1  Dec. 6, 2012

(30) Foreign Application Priority Data

Feb. 15, 2010  (DE) .......................... 10 2010 007 994

(51) Int. Cl.
*B62D 17/00*  (2006.01)
*B60G 7/00*  (2006.01)

(52) U.S. Cl.
USPC ................ 280/5.521; 280/5.522; 280/86.751; 280/86.758

(58) Field of Classification Search
USPC .......... 280/5.52, 5.521, 8.522, 86.75, 86.751, 280/86.758, 5.522
See application file for complete search history.

(56) References Cited

U.S. PATENT DOCUMENTS

| 4,037,680 A | 7/1977 | Grove |
| 4,836,574 A | 6/1989 | Ingalls |
| 5,427,395 A | 6/1995 | Urbach |
| 2005/0280241 A1* | 12/2005 | Bordini .................. 280/124.135 |

(Continued)

FOREIGN PATENT DOCUMENTS

| DE | 7 13 934 A | 11/1939 |
| DE | 19 13 618 A | 5/1970 |

(Continued)

*Primary Examiner* — Ruth Ilan
(74) *Attorney, Agent, or Firm* — Henry M. Feiereisen LLC

(57) ABSTRACT

A wheel suspension for a motor vehicle includes a support element on the wheel-side rotatably mounting a vehicle wheel and a carrier element on the axle-side, wherein the carrier element on the wheel-side can be adjusted for setting a toe and/or camber angle relative to the support element on the axle-side, wherein the carrier elements on the axle-side and on the wheel-side are coupled to a universal joint in which webs of the carrier elements on the wheel-side and on the axle-side are articulated on a gimbal ring element by means of bearing points. The webs of the support elements are articulated on the gimbal ring element at the bearing points by means of ball joints.

12 Claims, 3 Drawing Sheets

U.S. PATENT DOCUMENTS

Figure 1:
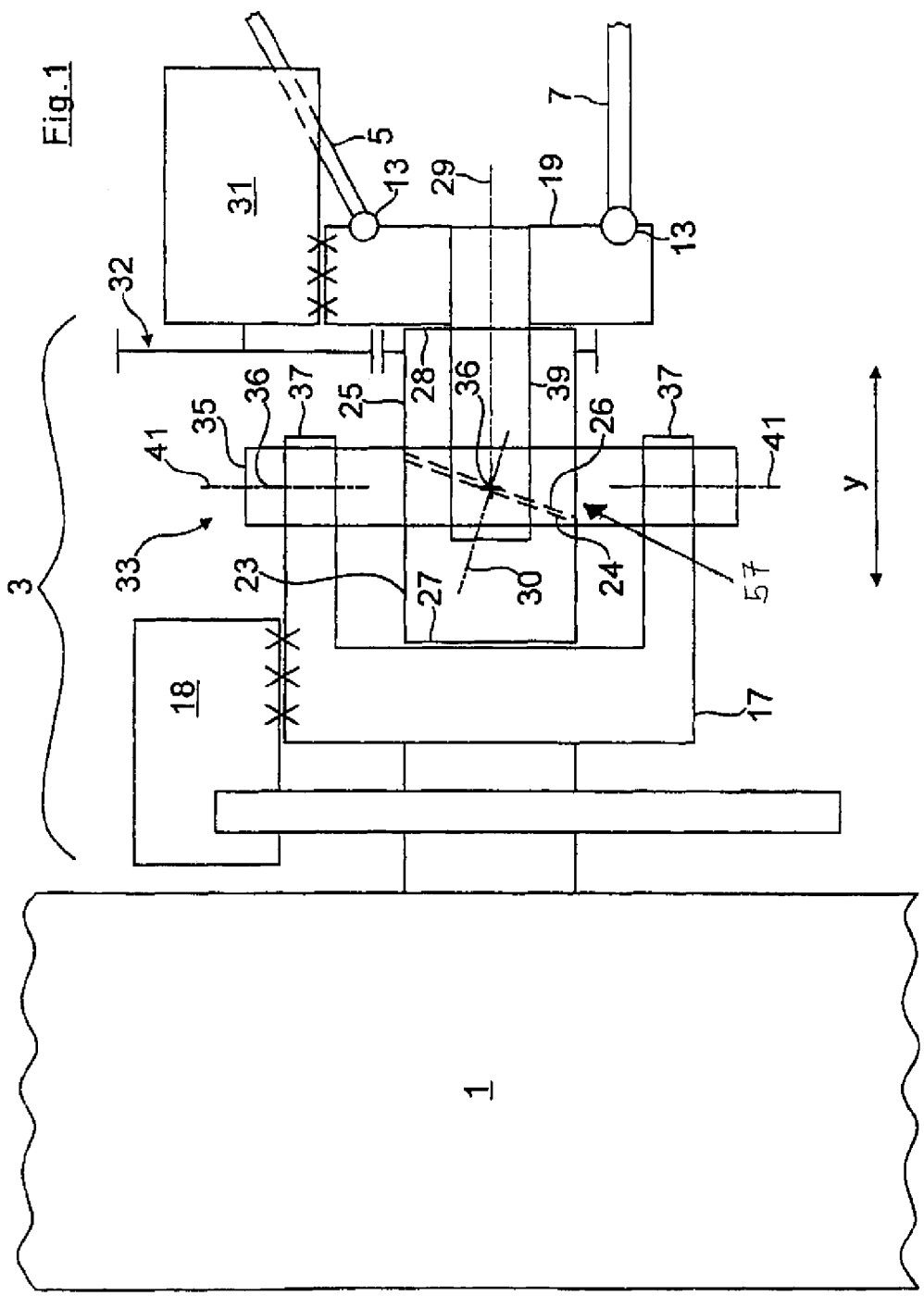

| | | | |
|---|---|---|---|
| 2010/0072714 A1* | 3/2010 | Schmid et al. | 280/5.521 |
| 2010/0156057 A1* | 6/2010 | Blondelet et al. | 280/5.52 |
| 2010/0253026 A1* | 10/2010 | Michel et al. | 280/86.751 |
| 2010/0327543 A1* | 12/2010 | Meitinger et al. | 280/5.521 |
| 2012/0049469 A1* | 3/2012 | Michel et al. | 280/5.52 |
| 2012/0126498 A1* | 5/2012 | Michel et al. | 280/5.52 |
| 2012/0193882 A1* | 8/2012 | Michel et al. | 280/86.751 |

FOREIGN PATENT DOCUMENTS

| | | |
|---|---|---|
| DE | 39 28 135 A1 | 3/1990 |
| DE | 10 2008 011367 | 4/2009 |
| DE | 10 2007 054 823 A1 | 5/2009 |
| JP | 2007 261 55 5 A | 11/2007 |
| WO | WO 96/07557 A1 | 3/1996 |

\* cited by examiner

WHEEL SUSPENSION FOR A MOTOR VEHICLE

The invention relates to a wheel suspension for a motor vehicle according to the preamble of patent claim 1.

In so called active steering systems, for example for the rear axle of vehicles, the wheel camber or respectively wheel toe can be adjusted via an actuating member thereby allowing to actively influence the driving behavior of the motor vehicle.

DE 10 2008 011 367 A1 discloses a wheel suspension of the generic type for a motor vehicle. A wheel carrier of the wheel suspension has a wheel-side carrier element which rotatably supports a vehicle wheel and an axle-side carrier element. Interposed between the wheel-side carrier element and the axle-side carrier element is an actuating member. When actuating the actuating member, the wheel-side carrier element is adjusted for setting a toe and/or camber angle of the vehicle wheel relative to the axle-side carrier element.

The actuating member is formed by two rotating parts, which are arranged between the wheel-side carrier element and the axle-side carrier element and are rotatable relative to one another about their rotation axes. By rotating one of the two rotating parts, alternatively also both rotating parts, the other one of the two rotating parts can be extended. Accordingly, the vehicle wheel provided on the wheel-side carrier element can be pivoted by a predetermined toe and/or camber angle. The two rotating parts can be rotated relative to one another in the same direction or in opposite directions at will in accordance with a control device in order to achieve an appropriate angle adjustment of the vehicle wheel.

The wheel-side carrier element and axle-side carrier element of the wheel carrier can be coupled to one another via an additional universal joint, via which a torque, for example a braking torque, is transferred to the axle-side carrier element from the wheel-side carrier element and with this to the vehicle body. With the universal joint a force path and/or torque path can be provided via which the braking torque can be reliably transferred to the vehicle body, namely by bridging the actuating means which is interposed between the carrier elements.

The universal joint can be constructed with wheel-side webs and axle-side webs which are molded to the carrier elements, which are offset to one another in circumferential direction and are articulated to a center gimbal element. The bearing points between the webs and the gimbal element are subjected to great stresses during driving, in particular during transferring of torques or when adjusting toe and/or camber. As a result thereof great demands are placed on the bearing points between the webs and the gimbal. Relevant are here in particular tolerance dependent angle deviations of bearing bolt which rotatably connects the respective web with the gimbal. When for example a bearing bolt is rotatably supported via a needle bearing, a small axial offset or angle error can already lead to a wear at the edges of the individual needles. This means that very arrow tolerances have to be used during manufacture, because the diametrically opposed bearing sites have to extend coaxial in order to avoid tension stresses in the universal joint.

The object of the invention is to provide a wheel suspension for a vehicle in which a permanent proper functioning is ensured.

The object is solved by the features of the patent claim 1. Preferred embodiments of the invention are set forth in the sub-claims.

According to the characterizing part of claim 1 the wheel-side and axle-side webs of the universal joint are each articulated to the gimbal element via a ball joint. Compared to other types of bearings, for example a needle bearing or a cylindrically formed slide bearing, no tilting or skewing result to angle errors and axle offsets. Rather, the ball joint can compensate such manufacturing tolerances by simple pivoting movements. In addition, the ball joint when used according to the invention results in a load capacity which is significantly higher at similar construction space than in a corresponding needle bearing because of the surface contacts between the run surfaces.

In the ball joint according to the invention the respective web and the gimbal element interacting with the web are respective joint partners of which a first joint partner can be formed with a convex spherical region. The convex spherical region of the first joint partner can be supported in a ball socket of the second joint partner for sliding movement.

In a technical realization the bearing shell can form a sleeve shaped outer part of the ball joint, into which the convex spherical region is inserted. The outer part which is formed with a cylindrical outer sheath can therefore be pressed into a corresponding receiving bore of one of the joint partners.

The convex spherical region which is supported in the ball socket for sliding movement can be made of the same material as, and in one piece with, the other joint partner. However it is preferred to form the convex spherical region as a separate sleeve shaped inner part, which can be carried by one of the joint partners.

For manufacturing it is advantageous when the convex spherical region and the concave spherical region can be provided as sleeve-shaped inner and outer parts in a pre-fabricated component. This component can be inserted into a receptacle during installation of one of the joint partners. The sleeve-shaped inner part of the ball bearing can be slid onto a bearing bolt by press fit, which bearing bolt is inserted in, in particular pressed into, the other joint part.

Accordingly, the convex spherical region which is manufactured as sleeve-shaped inner part can sit directly on the bearing bolt. The convex spherical region can be fitted without play to the concave spherical contour of the ball sleeve, for example in a rolling process. The convex spherical region can for example be made from bronze or steel.

The associated running surface on the convex spherical region can additionally be coated with Teflon in order to reduce a so called stick slip behavior and thus ensure a smooth-running cardanic extension.

In a preferred embodiment the gimbal element can have a window-like through opening in which the web which extends from the axle-side carrier or wheel-side carrier element protrudes. In this case the bearing bolt can be inserted into opposing bearing bores of the window-like through opening of the ring element, while its center convex spherical region is seated without play in the ball socket of the inwardly protruding web.

Preferably the bearing bolt can be pressed into bearing bores of the ring element in a rotatively fixed manner. The bearing bolt can have a ring shoulder which projects radially outward, wherein the bearing bolts can be pressed into the bearing bore of the gimbal element until this ring shoulder comes into contact with the gimbal element.

Between the axle-side and the wheel-side carrier element an actuating member can be interposed. When actuating the actuating member the wheel-side carrier element can be adjusted for setting the toe and/or camber angle of the vehicle. With the universal joint torques for example braking torques can be transferred from the wheel-side carrier element to the axle-side carrier element.

In the following, an exemplary embodiment of the invention is shown by way of the included Figures.

It is shown in

Figure 2:
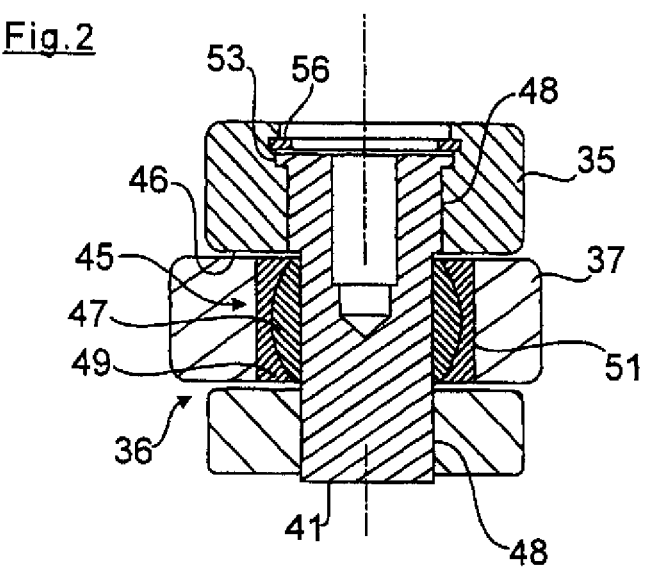
Figure 3:
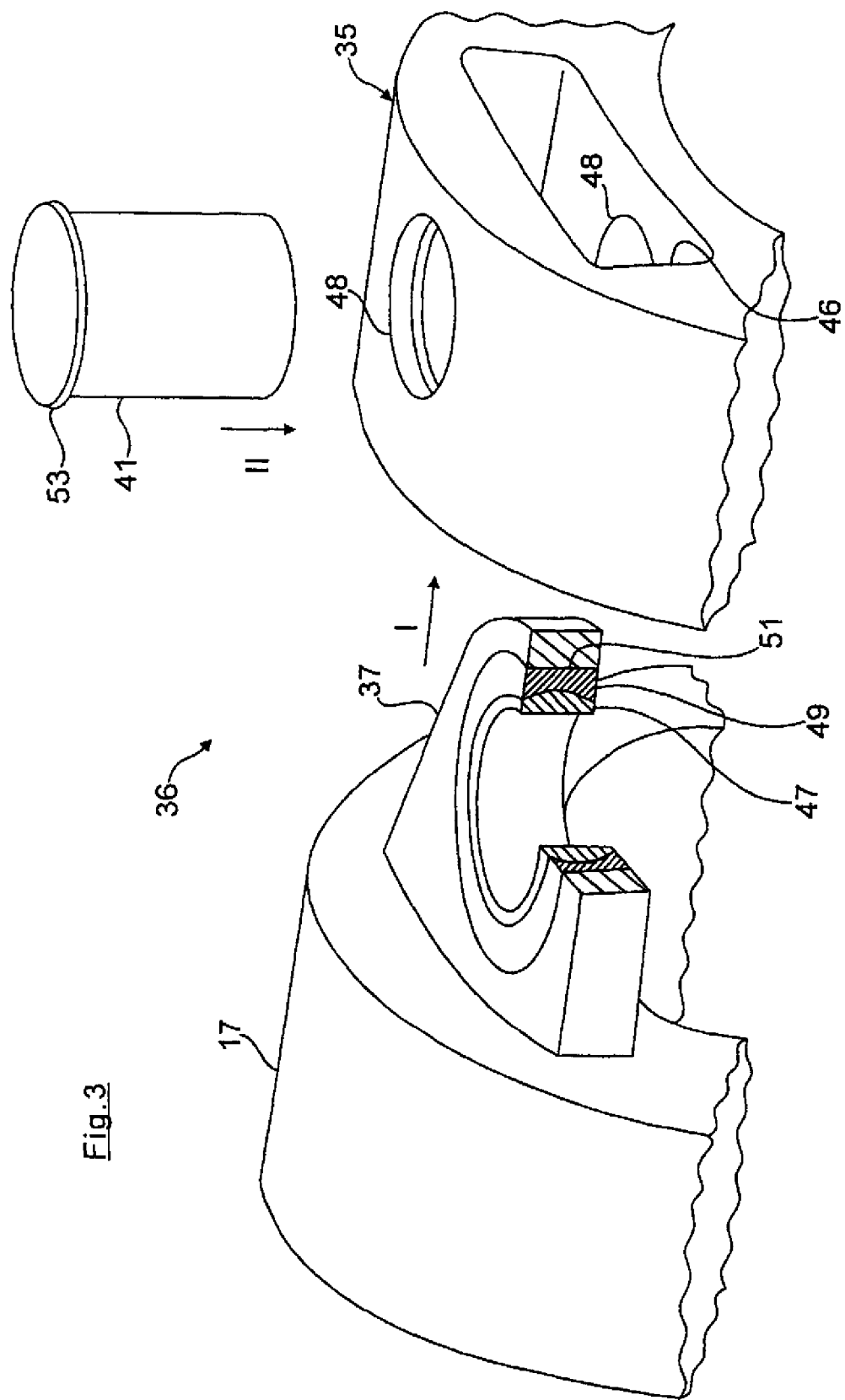

FIG. 1 in a schematic representation a wheel suspension with a vehicle wheel,

FIG. 2 in an enlarged sectional representation a ball joint used in a bearing site of the universal joint of the wheel suspension, and FIG. 3 the bearing site of the universal joint in an exploded view.

FIG. 1 shows a wheel suspension, for example for a transverse steering axle, in which a wheel carrier 3 which carries the vehicle wheel 1 is pivotally connected to the vehicle body by means of an upper transverse control arm 5 and a lower transverse control arm 7 via not further shown vehicle body-side link bearings. The wheel carrier side link bearings 13 are constructed in a customary manner.

According to FIG. 1 the wheel carrier 3 has a wheel-side carrier element 17 and an axle-side carrier element 19. On the wheel-side carrier element 17 the vehicle wheel is supported via a wheel hub in a not shown wheel bearing of the wheel-side carrier element 17. In addition, a schematically indicated breaking system 18 is arranged on the wheel-side carrier element 17.

Interposed between the two carrier elements 17, 19 of the wheel carrier 3 is an actuating member, with the toe and/or camber of the vehicle being adjustable when the actuating member is actuated. The actuating member has a wheel-side rotating part 23 and an axle-side rotating part 25. The two rotating parts 23, 25 are in contact with one another via slanted control surfaces 24, 26. With their face sides 27, 28 the two rotating parts 23, 25 of the actuating member are each in sliding contact or rolling contact with the two carrier elements 17, 19.

The axle-side rotating part 25 is respectively rotatable about a rotation axis which essentially extends in the transverse direction y of the vehicle, while the wheel-side rotating part 23 is rotatable about a rotation axis which is angled relative to the rotation axis 29 and extends perpendicular to the two control surfaces 24, 26. The two rotating parts 23, 25 are each rotatably actuatable by means of drive motors of which only drive motor 31 is shown in FIG. 1. The drive motor 31 is fastened on the axle-side carrier element 19 and connected to the rotating part 25 via a schematically indicated transmission train 32. Analogously, a drive motor is fastened on the carrier element 17, which drive motor is connected to the rotating part 23. The two drive motors are controllable by a here not shown control device, by means of which the two rotating parts 23, 25 of the actuating member are rotatable relative to one another so that a respectively desired toe and/or camber angle of the vehicle wheel 1 is established.

The two control surfaces 24, 26 lie in a slanted rotation plane. When the two rotating parts 23, 25 rotate, the control surfaces, which contact one another, roll or slide off of one another in the slanted plane.

According to FIG. 1, the two carrier elements 17, 19 of the wheel carrier 3 are coupled to one another via a universal joint 33. The universal joint 33 serves as a torque bridge, via which torques can be transferred from the wheel-side carrier element 17 to the axle-side carrier element 19 and with that to the vehicle body. The actuating member which is formed by the rotating parts 23, 25 on the other hand remains unencumbered by such torque stresses. Such torques to be transferred are for example braking torques or reaction torques from the contact force of the wheel.

According to FIG. 1 the universal joint 33 has as a central joint part a gimbal 35 which extends radially outside about the rotating parts 23, 25 of the actuating member. The wheel-side carrier element 17 is respectively connected to the gimbal 35 via a universal joint fork which is formed by two axial webs 37. In addition, the axle-side carrier element 19 is also connected to the gimbal via two axial webs 39. The axle-side axial webs 39 are offset relative to the wheel-side axial webs 37, so that in FIG. 1 only an axle-side axial web 39 of the carrier element 19 can be seen.

Each of the axial webs 37, 39 forms bearing points 36 with the gimbal 35. The axial webs 37, 39 of the universal joint 33 are rotatably articulated to each bearing point 36 via bearing bolts 41, which are only indicated by dot-dash lines, whereby a cardanic compensating movement during a toe and/or camber adjustment can occur.

One of the above mentioned bearing points 36 between the axial webs 37, 39 and the gimbal 35 is shown in FIG. 2 in a sectional side view and enlarged. According to this the shown axial web 37 is connected to the axial web 37 via a ball joint 45. For forming the ball joint 45 the gimbal 35 has a window like through opening 46 on at the bearing position 36, into which the axial web 37 protrudes. The window-like through opening 46 has opposing bearing bores 48 into which the bolt ends of the bearing bolt 41 are pressed. Between the two bolt ends, the bearing bolt 41 has approximately in its center a convex spherical region 47. This spherical region according to FIG. 2 is supported without play and for sliding movement in a ball socket 49. The ball socket 49 in turn is inserted in a receiving bore 51 for the axial web 37, which receiving bore 51 is oriented to approximately align with the bearing bores 48.

The upper bolt end shown in FIG. 2 is formed with a ring collar 53 which is in contact with a corresponding ring shoulder which is formed in the bearing bore 48. For securing the bearing bolt 41 in the two bearing bores 48 a clamping ring 56 is provided above the ring collar 53. This clamping ring 56 is radially widened compared to the ring collar 53 and inserted into a recess which is formed radially outwardly in the bearing bore 48.

The bearing position 36 shown in FIG. 2 is shown in an exploded view in FIG. 3.

Accordingly, the convex spherical region 47 is a sleeve like inner part, which is already inserted into the ball socket 49 in a preassembly step. The ball socket 49 is a sleeve-like outer part which is pressed with its cylindrical outer sheath surface into the receiving bore 51 of the axial web 37.

In the further mounting process the axial web 37 of the carrier element 17 is slid into the window-like through opening of the gimbal 35 in a direction of motion I, until the bore which is delimited by the sleeve-like inner part 47 of the ball joint 45 is oriented to align with the bearing bores 48 of the gimbal 35. Subsequently the bearing bolt 41 is pressed into the bearing bores 48 in a pressing process II.

LIST OF REFERENCE SIGNS

1 Vehicle wheel
3 Wheel carrier
5, 7 transverse control arm
13 link bearing
17 wheel-side carrier element
18 break system
19 axle-side carrier element
24 control surface
25 axle-side rotating part
26 control surface
27, 28 face sides
29, 30 rotation axes 31 drive motor
32 transmission train
33 universal joint
35 gimbal
36 bearing points
37, 39 axial webs
41 bearing bolts
45 ball bearing
46 through opening
47 convex spherical region
48 bearing bore
49 concave ball socket
51 receiving bore
53 ring collar
56 clamping ring

The invention claimed is:

1. A wheel suspension for a vehicle, comprising:
a wheel-side carrier element having wheel-side webs, said wheel side carrier element rotatably supporting a vehicle wheel; and
an axle-side carrier element having axle-side webs, wherein the wheel-side carrier element is adjustable relative to the axle-side carrier element for setting a toe and/or camber angle, wherein the axle-side carrier element and the wheel-side carrier element are coupled to a universal joint via bearing points, wherein at each bearing point the wheel-side webs and axle-side webs are articulated to a gimbal element via ball joints.

2. The wheel suspension of claim 1, wherein each of said ball joints comprises a convex spherical region and a concave ball socket, and wherein the convex spherical region is supported in the concave ball socket for sliding movement.

3. The wheel suspension of claim 1, wherein in each of the bearing points the wheel-side webs and the axle-side webs are connected to the gimbal element via a bolt element.

4. The wheel suspension of claim 3, wherein the convex spherical region of the ball joint is seated on the bolt element.

5. The wheel suspension of claim 2, wherein the concave ball socket forms a sleeve-shaped outer part of the ball joint, the convex spherical region being inserted in the sleeve-shaped outer part.

6. The wheel suspension of claim 2, wherein the convex spherical region and the ball socket are formed as a preassembled construction unit which is insertable into a receptacle of one of the wheel side webs, the axle side webs and the gimbal.

7. The wheel suspension of claim 1, wherein the gimbal element has a window-like through opening, and wherein the wheel-side webs and the axle-side webs protrude into the window-like through opening.

8. The wheel suspension of claim 7, wherein the bolt element has bolt ends on both sides of the convex spherical region in an axial direction, said bolt ends being inserted into opposing bearing bores of the window-like through opening.

9. The wheel suspension of claim 8, wherein the bolt ends are pressed into the opposing bearing bores.

10. The wheel suspension of claim 1, further comprising an actuating member interposed between the axle-side carrier element and the wheel-side carrier element, wherein the wheel-side carrier element is adjustable when the actuating member is actuated to thereby set the toe and/or camber angle.

11. The wheel suspension of claim 1, wherein a torque is transferrable from the wheel-side carrier element to the axle-side carrier element via the universal joint.

12. The wheel suspension of claim 11, wherein the torque is a braking torque.

* * * * *